Feb. 9, 1937. W. E. BANNERMAN 2,070,504
COMBINED EXPANDER AND FLANGER FOR LINED PIPES
Filed April 6, 1935
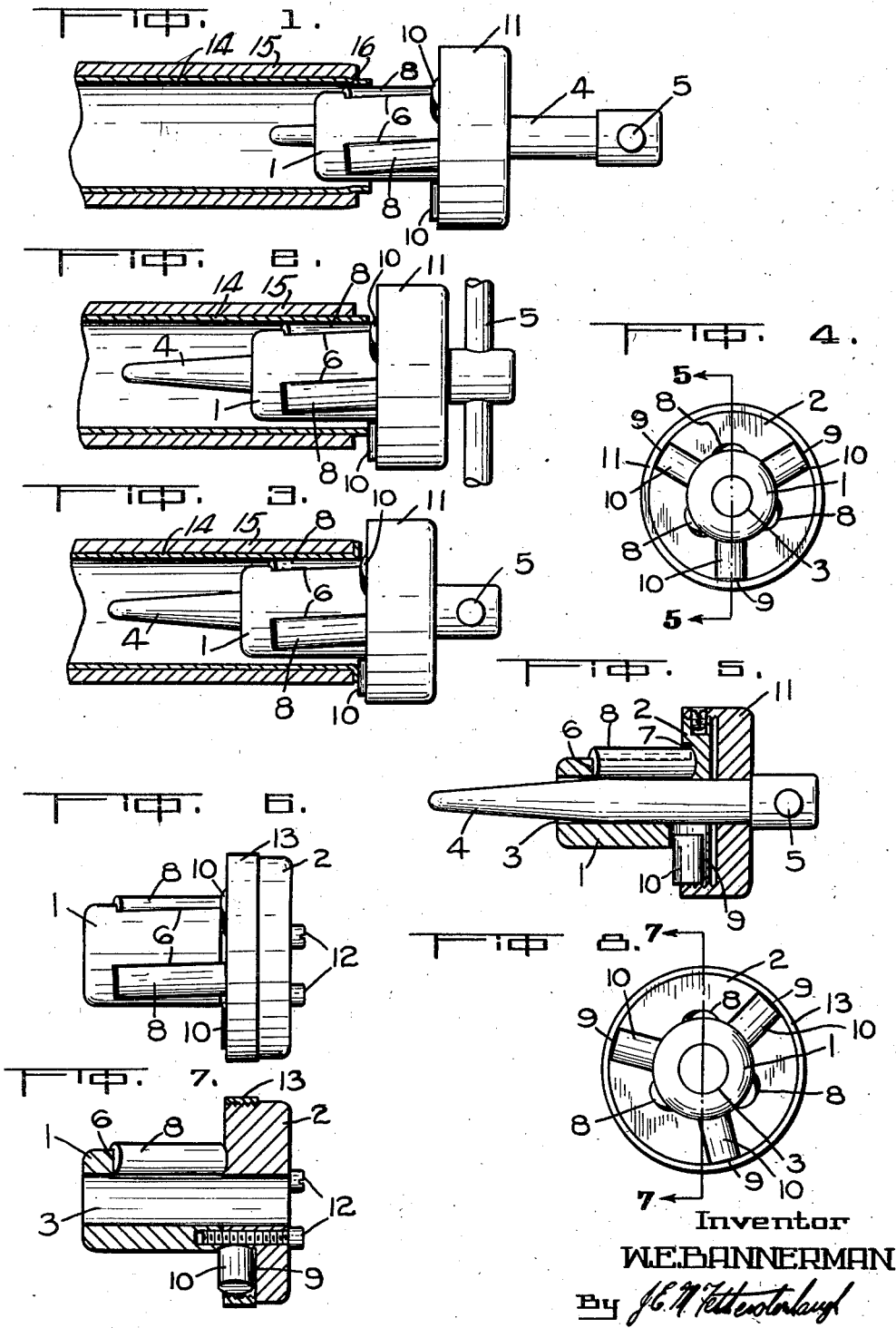
Inventor
W. E. BANNERMAN Patented Feb. 9, 1937

2,070,504

UNITED STATES PATENT OFFICE 2,070,504

COMBINED EXPANDER AND FLANGER FOR LINED PIPES

William Ewart Bannerman, Toronto, Ontario, Canada

Application April 6, 1935, Serial No. 15,014

3 Claims. (Cl. 153—82)

My invention relates to improvements in combined expanders and flangers for lined pipes and the object of the invention is to devise a tool for the purpose of forming the end of a lined pipe into the required form suitable for insertion into a standard non-corrodible fitting to constitute a non-corrodible joint for lined pipes.

A further object is to originate a tool which will first remove the internal burr on the liner caused by cutting off a portion of the outer shell of the pipe to leave a protruding end on the liner extend beyond the end of the main portion of the shell remaining, and which will subsequently flange such protruding end into a flange covering the end of such shell portion as is described and claimed in my copending application Serial No. 15,013, filed April 6, 1935, for improvements in Methods of forming lined pipe ends.

With the above and other objects in view which will hereinafter appear as my specification proceeds, my invention consists, in its preferred embodiment, of the construction and arrangement all as hereinafter more particularly described and illustrated in the accompanying drawing in which:—

Fig. 1 represents a longitudinal section through a lined pipe which has previously had the end of its outer shell cut off to leave the end of the liner protruding showing my combined expander and flanger in elevation applied thereto.

Fig. 2 is a similar view to Fig. 1 showing my device further inserted into the pipe end and having removed the burr formed on the interior of the liner caused by cutting off the extremity of the outer shell of the pipe.

Fig. 3 is a similar view to Figs. 1 and 2 showing my device further inserted into the pipe end and having flanged the protruding end of the liner.

Fig. 4 is an end view of my device viewed from the end inserted into the pipe.

Fig. 5 is a longtudinal section through the line 5—5 (Fig. 4).

Fig. 6 is a side elevation of a slightly modified form of my tool.

Fig. 7 is a longitudinal section thereof taken through the line 7—7 (Fig. 8), and Fig. 8 is an end view of such modification taken from the end inserted into the pipe.

Like characters of reference indicate corresponding parts in the different views.

My tool as illustrated in Figs. 1 to 5 comprises a cylindrical member 1 having a circular boss 2 at one end, the interior 3 of the member 1 being adapted to receive a tapered tipped cylindrical spindle 4 having a cross handle 5 provided at the end opposite its tip.

Spaced apart apertures 6 raked in the same direction extend through the cylindrical member 1 and communicate with apertures 7 in the adjacent face of the boss 2, and cylindrical rollers 8 are disposed in such apertures freely rotatable therein and capable of being moved outwardly under the wedge action exerted by the spindle 4 when it is forced into the cylindrical member.

Spaced apart radial roller receiving recesses 9 are disposed in the face of the boss 2 adjacent to the member 1 and receive rollers 10 which are freely rotatable therein and protrude from such face.

A cap member 11 is threaded over the peripheral face of the boss 2 and prevents displacement of the rollers 10, the spindle 4 extending freely through the centre of the cap member.

The construction illustrated in Figs. 6 to 8 only differs from that illustrated in Figs. 1 to 5 in that the boss 2, instead of being integral with the cylindrical member 1, is secured to one end thereof concentrically therewith by means of the studs 12 and the rollers 10 are held against displacement by means of a ring 13 which may be threaded onto the peripheral face of the boss 2.

To operate the tool the cylindrical member 1 is inserted into the liner 14 of the pipe which has a surrounding outer shell 15 as illustrated in Fig. 1, it being observed that due to the cutting off of the extremity of the shell 15 a slight burr designated as 16 is formed on the interior of the liner 14. When the member 1 is in place, the tapered spindle 4 is forced into the member 1 with the result that the rollers 8 are pressed outwardly against the interior of the liner and when the device is then rotated by means of the handle 5, the burr 16 is rolled out as illustrated in Fig. 2.

Due to the rake of the rollers 8, as the device is rotated, the cylindrical member 1 is drawn into the pipe as a screw action ensues and likewise the tapered spindle 4 is drawn into the cylindrical member by the screw action of the rollers 8. Eventually the rollers 10 in the boss 2 come into contact with the protruding end of the liner 14 flanging it and forming it into a flange which by such rollers is rolled against the end of the shell portion 15 completely covering it as is illustrated in Fig. 3 of the drawing.

The rollers 10 have their axes disposed substantially radially in the circular boss 2 and are in no way influenced in their disposition by the insertion of the spindle 4 into the member 1 as is the case with the rollers 8. The function of such rollers 10 is solely to form a flange on the protruding end of the liner which will be perpendicular to its axis and will thus cover and abut the end of the outer shell.

When the end of the pipe is suitably formed, the tool may be removed by rotating it in the reverse direction and partially withdrawing the spindle 4 to relieve the pressure on the rollers 8.

After the above operation is completed on the pipe end, it is in condition to be exteriorly threaded for insertion into a non-corrodible fitting to form a non-corrodible joint for the pipe.

What I claim as my invention is:

1. In a combined rotatable expander and flanger for lined pipes wherein the liner protrudes beyond the outer shell, in combination, a rotatable cylindrical member insertable into the liner of the pipe including expansible means thereon engageable with the interior of the liner for expanding the latter and simultaneously propelling the cylindrical member and the expansible means into the pipe as such cylindrical member and expansible means are rotated, and means on the cylindrical member independent of the expansible means and unaffected thereby for engaging the protruding end of the liner and forming it into a flange covering and abutting the end of the outer shell.

2. A combined rotatable expander and flanger for lined pipes as claimed in claim 1 wherein the means on the cylindrical member for flanging the protruding end of the liner comprises a plurality of rollers freely mounted on the cylindrical member with their axes disposed radially and perpendicularly to the axis of the cylindrical member.

3. A combined rotatable expander and flanger for lined pipes as claimed in claim 1 wherein the means on the cylindrical member for flanging the protruding end of the liner comprises a circular concentric boss formed on the cylindrical member in the vicinity of its outer end and having a plurality of radially disposed roller receiving orifices disposed in its forward face, and a roller disposed in each aperture and freely rotatable therein, each of said rollers having a portion of its surface extending outwardly beyond the forward face of the circular boss.

WILLIAM EWART BANNERMAN.